United States Patent [19]

Cline et al.

[11] 4,014,400
[45] Mar. 29, 1977

[54] MOUNTING ARRANGEMENT FOR DETACHABLY COUPLING A VEHICLE FRAME TO A GROUND-ENGAGING UNDERCARRIAGE

[75] Inventors: Lawrence R. Cline, Oswego; Theodore B. Hogg, Aurora, both of Ill.

[73] Assignee: Caterpillar Tractor Co., Peoria, Ill.

[22] Filed: Dec. 22, 1975

[21] Appl. No.: 643,457

[52] U.S. Cl. .............................. 180/9.2 R; 305/16
[51] Int. Cl.² ..................................... B62D 55/00
[58] Field of Search ............ 180/9.2 R, 9.2 C, 9.48, 180/6.48, 6.7; 305/16, 60

[56] References Cited

UNITED STATES PATENTS

| | | | |
|---|---|---|---|
| 3,037,571 | 6/1962 | Zelle | 180/9.48 |
| 3,313,368 | 4/1967 | Carter et al. | 180/9.2 |
| 3,317,245 | 5/1967 | Arndt | 180/6.48 |
| 3,385,014 | 5/1968 | Haug | 52/116 |
| 3,512,598 | 5/1970 | Shatoska | 180/9.48 |
| 3,750,779 | 8/1973 | Huseman | 305/60 |
| 3,872,939 | 3/1975 | Eckert | 180/6.48 |

Primary Examiner—Joseph F. Peters, Jr.
Assistant Examiner—John A. Pekar
Attorney, Agent, or Firm—Charles E. Lanchantin, Jr.

[57] ABSTRACT

A vehicle frame to undercarriage mounting arrangement is disclosed including a vehicle frame having a member with a substantially upstanding planar bearing surface thereon, an undercarriage for supporting the frame including a substantially upstanding planar bearing surface thereon which is engageable against the corresponding surface of the frame member, and a coupling including interlocking projection and recess means edgewardly disposed on the undercarriage and the frame member for maintaining the bearing surfaces in abutting force transmitting engagement and with the coupling resisting lateral separation thereof.

9 Claims, 6 Drawing Figures

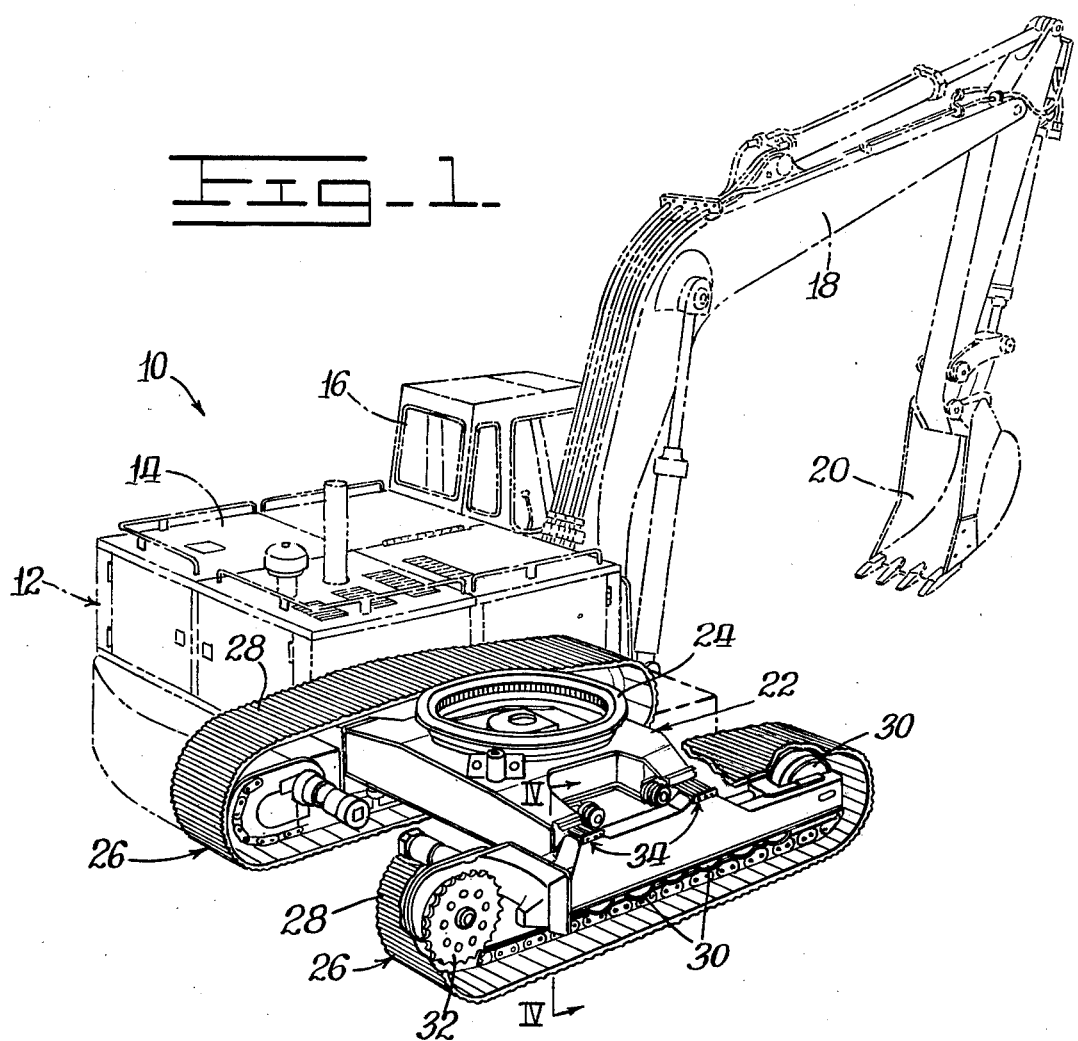
Fig_1_
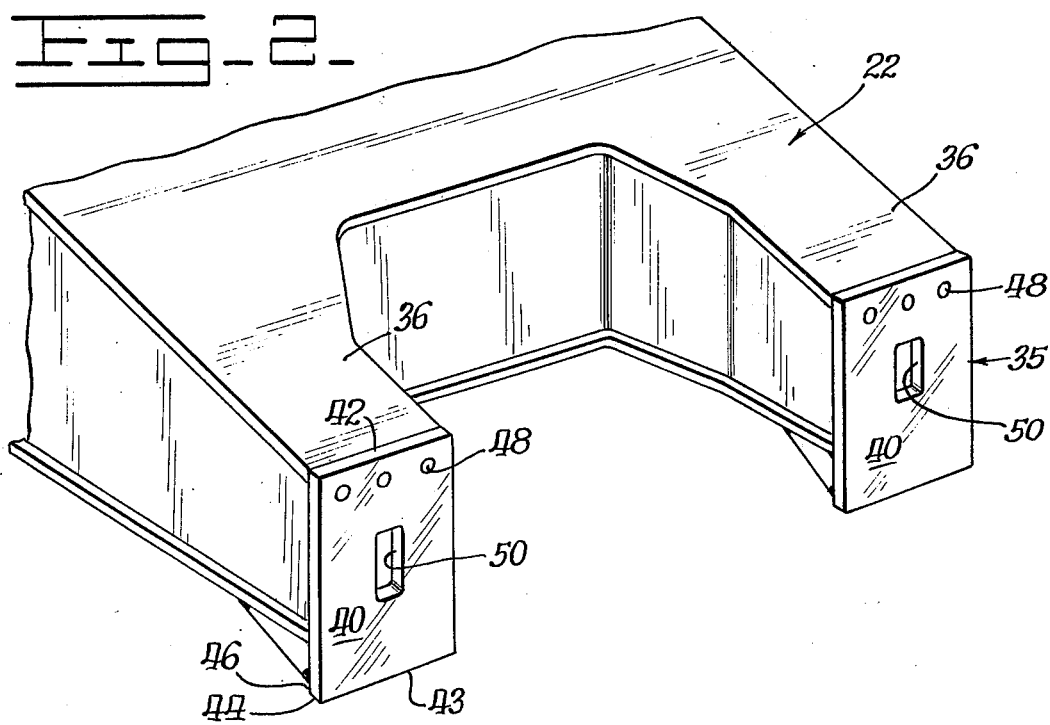
Fig_2_

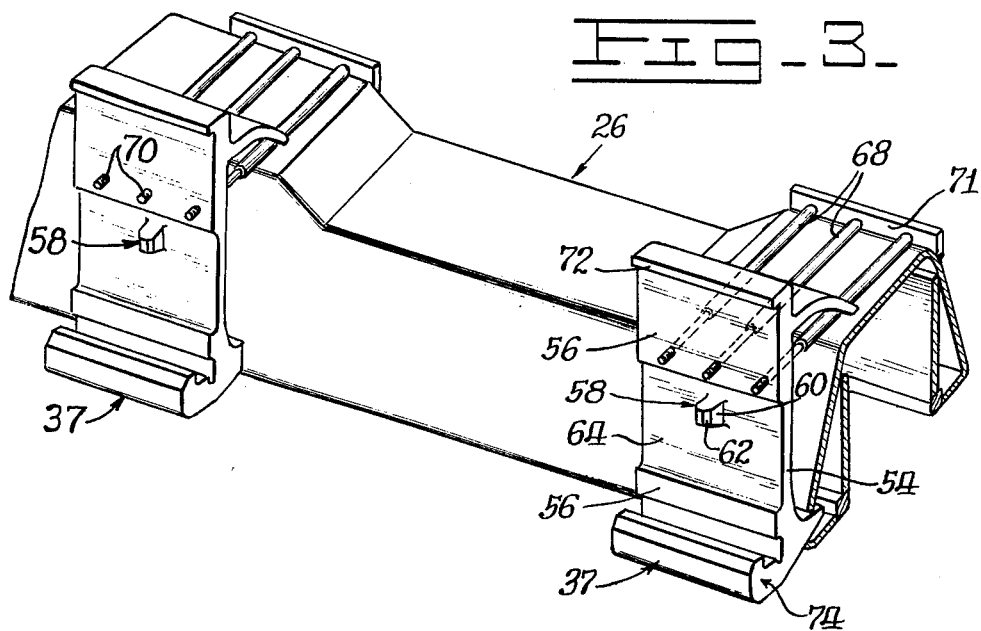
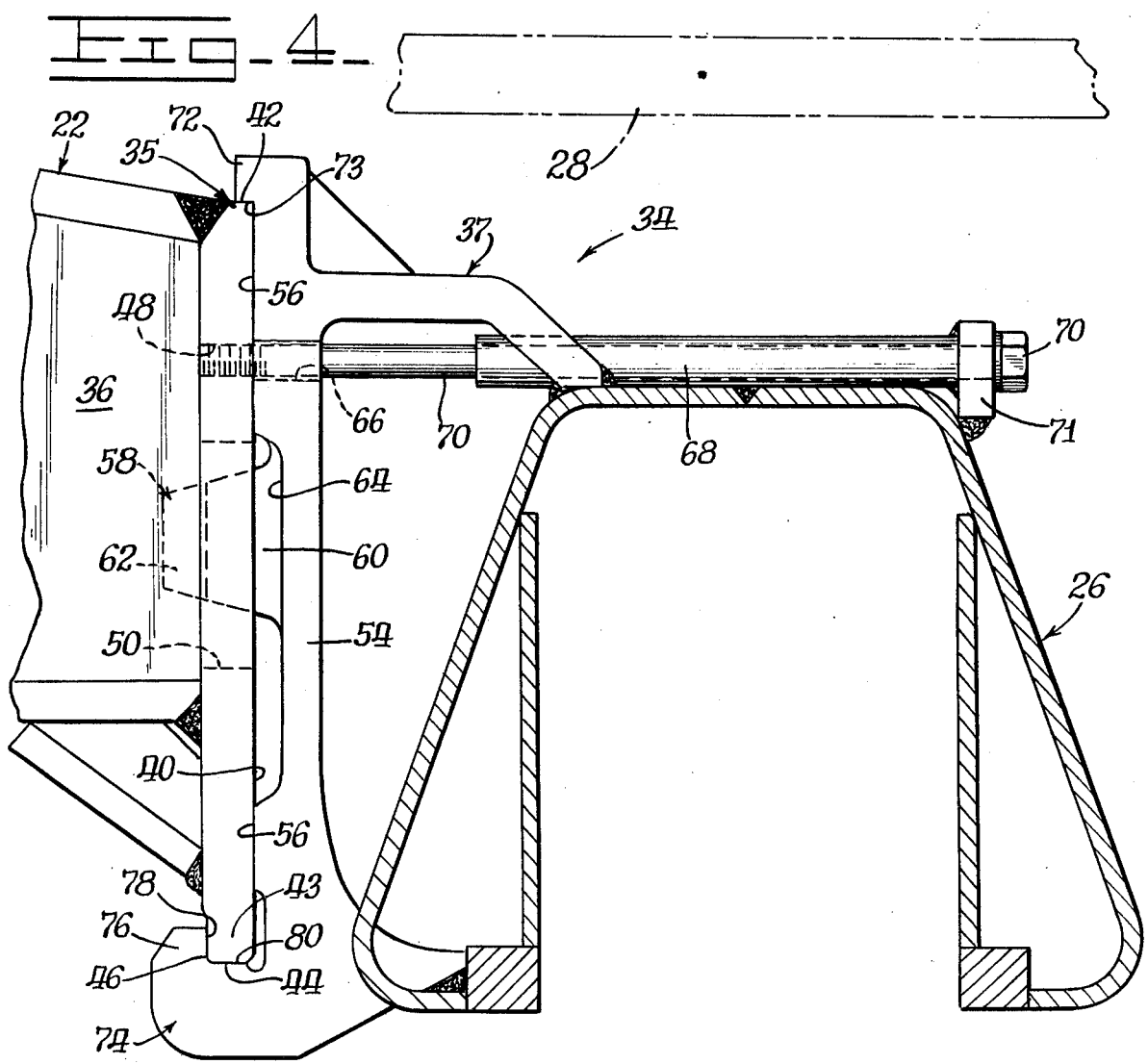

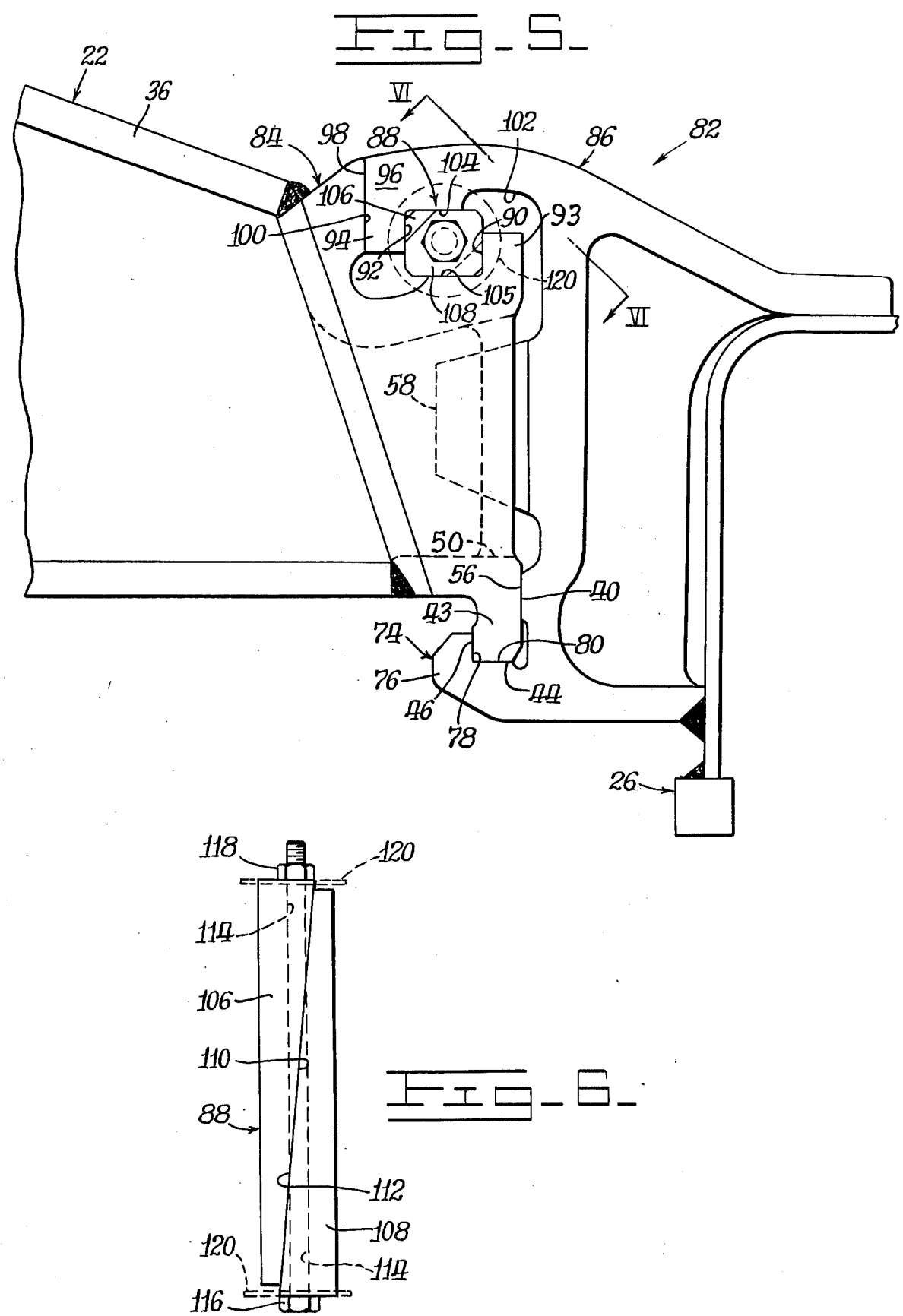

MOUNTING ARRANGEMENT FOR DETACHABLY COUPLING A VEHICLE FRAME TO A GROUND-ENGAGING UNDERCARRIAGE

BACKGROUND OF THE INVENTION

Track-type vehicles, such as hydraulic excavators, normally have a substantial gauge width between the track roller frames in order to increase the overall stability of the vehicle during earthworking operations. Because this gauge width frequently exceeds the legal shipping width as dictated by various governmental regulations, the track roller frames of the vehicle must be disassembled from the car body frame for transportation purposes. Such procedures are time consuming and expensive to carry out.

In the past, the superstructure and car body frame of a considerable number of these vehicles have been mounted on the opposite undercarriages by utilizing a relatively large number of vertically oriented fastening devices disposed at each of the four legs of the car body frame. Normally too, a pair of horizontally disposed mounting surfaces on each of the undercarriages supports a pair of these laterally extending legs, and with this arrangement the legs of the larger machines extend so far as to present an overall width beyond the permissible shipping limits of approximately 8 – 12 feet or 2.5 – 3.5 meters.

When the abutting mounting surfaces are reoriented from the usual horizontal disposition to a vertical disposition in order to decrease the overall width of the car body frame, other problems are experienced. For example, it has been found that an excessive number of fastening bolts must be used to provide a sufficiently strong joint and to particularly resist the heavy shear loads that occur in use. In order to reduce the number of bolts, close fitting cylindrical pins or dowels have been projectingly mounted on one of the members for guided insertion into a corresponding number of openings on the other. For example, reference is made to the car body leg construction disclosed in U.S. Pat. No. 3,037,571 issued to L. L. Zelle on June 5, 1962. Here also, such supplementary shear-resisting elements give rise to costly manufacturing problems. Specifically, the relatively large diameter cylindrical pins and mating holes must be precisely aligned in order to adequately transfer the heavy loads between the members. This is not only costly, but adds to the complexity of the assembling operation.

SUMMARY AND OBJECTS OF THE INVENTION

Accordingly, it is an object of the present invention to provide a vehicle frame to undercarriage mounting arrangement which is disposed further inwardly toward the central axis of the vehicle, in order to minimize the overall width of the vehicle frame for shipping purposes.

Another object of the present invention is to provide such an improved mounting arrangement which allows the vehicle frame to be relatively easily coupled to and removed from the undercarriage.

Another object of this invention is to provide a mounting arrangement of the character described which is strong, and yet utilizes a relatively low number of fastening devices therefor.

Other objects and advantages of the present invention, such as allowing both the vehicle frame and undercarriage to be deeply sectioned for maximum strength, will become more readily apparent upon reference to the accompanying drawings and following description.

BRIEF DESCRIPTION OF THE DRAWINGS

FIG. 1 is a rear oblique perspective view of a hydraulic excavator with the superstructure and work implement shown in phantom outline form, and with the car body frame and pair of undercarriages shown in solid line form in order to better show the mounting arrangement of the present invention.

FIG. 2 is an enlarged and fragmentary, three-dimensional view of the car body frame illustrated in FIG. 1 which is constructed in accordance with the present invention.

FIG. 3 is an enlarged and fragmentary, three-dimensional view of the laterally inside portion of the undercarriage illustrated in FIG. 1 showing a pair of longitudinally spaced brackets constructed in accordance with the present invention, and which brackets are alignably coupled to the car body frame of FIG. 2.

FIG. 4 is a substantially enlarged and fragmentary transverse vertical sectional view of an undercarriage as taken along the line IV—IV of FIG. 1 and presenting an assembled end view of a car body leg and undercarriage support bracket.

FIG. 5 is an assembled end view of an alternate embodiment of the mounting arrangement of the present invention which is comparable with FIG. 4.

FIG. 6 is a 45° oblique top plan view of a locking device which is utilized in the alternate embodiment mounting arrangement as taken along the line VI—VI of FIG. 5.

DESCRIPTION OF THE PREFERRED EMBODIMENT

Referring now to FIG. 1, an earthmoving vehicle, such as a hydraulic excavator 10 is illustrated which has a superstructure 12 including a power plant 14, an operator's station 16, and an outwardly extending boom 18 having a work implement 20 thereon. The superstructure shown in phantom lines is rotatably mounted on a vehicle frame or car body frame 22 shown in solid lines through an annular ring gear and bearing arrangement 24 of conventional construction. In turn, the car body frame is supported by a pair of laterally spaced and substantially parallel ground-engaging undercarriages or track roller frames 26, each having an endless track chain 28 mounted on a plurality of idler wheels 30 and adaptably driven by a powered sprocket 32 in the usual manner. In the particular embodiment illustrated, a pair of vehicle frame to undercarriage mounting arrangements 34, constructed in accordance with the present invention, are disposed laterally inwardly of each of these undercarriages.

Basically, as is clearly illustrated in FIGS. 2, 3 and 4, each of the mounting arrangements 34 includes a frame member 35 forming the laterally outer portion of each car body leg 36, and a support bracket 37 which is weldably secured to the undercarriage 26 and is removably coupled to the frame member.

More particularly, and as best shown in FIGS. 2 and 4, each frame member 35 consists of a relatively simple, outwardly facing plate which is weldably secured in an upstanding manner to the leg 36 of the car body frame 22. This plate thereby provides a substantially vertically oriented, and longitudinally extending planar bearing surface 40, a top bearing surface or upper edge 42, and a depending leg 43 having a bottom bearing surface or bottom edge 44 and an inwardly facing bearing surface 46 thereon. Furthermore, each of the frame members includes a plurality of internally threaded bores 48 at its upper extremity, and includes a vertically elongated recess 50 formed centrally therein which extends horizontally inwardly from the planar bearing surface 40.

As is clearly apparent in FIGS. 3 and 4, each of the inwardly facing support brackets 37 is adapted to be coupled to one of the frame members 35. Accordingly, each bracket is weldably or otherwise secured to the undercarriage 26 in a substantially upstanding manner laterally inwardly thereof. The support brackets individually include an appropriately contoured upright body 54 which provides a pair of vertically spaced and substantially vertically oriented planar bearing surfaces 56 thereon which extend longitudinally for facing engagement with the planar bearing surface 40 of the frame member 35. A piloting projection 58 having parallel sides 60 and a tapered nose portion 62 extends horizontally inwardly from a recessed surface 64 in the body of the support bracket, and which projection is adapted to be guidably received in the recess 50 of the frame member. A plurality of transversely oriented horizontal openings 66 are also defined in the body, and a corresponding plurality of bolt guiding tubes 68 are secured to the body and the upper portion of the undercarriage 26 in laterally aligned relation therewith to permit a plurality of elongated fastening devices or bolts 70 to be screw threadably inserted laterally inwardly into the threaded bores 48 of the frame member. For additional rigidity, an apertured bolt tie-in strip 71 may be weldably secured longitudinally to the undercarriage to better resist the lateral loading provided by the bolts.

More particularly, each of the support brackets 37 includes a laterally inwardly projecting upper lip 72 which provides a downwardly facing surface or ledge 73, and an inwardly extending hooking coupling or support rail 74 at its lower extremity. Both the upper ledge and lower coupling extend longitudinally for lateral embracing engagement respectively with the upper edge 42 and the bottom edge 44 of the frame member 35. In accordance with one aspect of the present invention the coupling provides an upwardly extending ledge 76 and a laterally outwardly facing bearing surface 78 thereon which effectively cooperates with the depending leg 43 and the surface 46 to minimize lateral separation of the frame member and the support bracket thereat. At the same time the coupling provides an upwardly facing support surface 80 which is normally abuttingly engaged with the bottom edge 44 of the frame member to support the weight of the car body frame 22 and the superstructure 12.

OPERATION

While the construction of the present invention is believed clearly apparent from the foregoing description, further amplification will subsequently be made in the following brief summary of such operation. Referring now to FIG. 4, the car body frame 22 is elevated sufficiently to enable the undercarriage 26 to be conveniently connected thereto in the following manner. Initially, the undercarriage is moved laterally inwardly with the projections 58 of the support brackets 37 aligned generally longitudinally with the recesses 50 in the frame members 35. The tapering nose portions 62 thereof serve to guide the projections into the recesses whereupon the sides 60 thereof are relatively closely confined with approximately 1.6 mm (1/16 inch) or less free play, to thus establish the longitudinal relationship of the undercarriage to the car body frame and to interlockingly resist high longitudinal shear forces therebetween. Moreover, it is clearly apparent that due to manufacturing tolerances and economic reasons it may well be desirable to utilize only one projection and correspondingly associated recess for one side of the vehicle.

Preferably, the undercarriage 26 is cantibly supported in a slightly clockwise manner from the position illustrated in FIG. 4 with the ledges 73 of the support brackets 37 disposed laterally outwardly of the support surfaces 80. This enables the lower portions of the frame members 35, and particularly the planar bearing surfaces 40 thereat, to abut the lower planar bearing surfaces 56 of the support brackets. With the bracket ledges 76 disposed inwardly of the depending legs 43, the undercarriage is raised slightly to insert the legs interlockingly into the couplings 74 and to interengage the bottom edges 44 with the support surfaces 80. This is achieved with the bracket projections 58 moving relatively freely within the vertically elongated recesses 50 of the frame members. The undercarriage is thereafter cantibly rocked in a counterclockwise manner back to its normal upright position whereupon the upper edges 42 of the frame members barely clear the ledges 73 of the brackets, and the upper portions of the upstanding bearing surfaces 40 engage the upper portions of the bearing surfaces 56 of the brackets. Thus, the vertical and horizontal relationship of the frame members and the brackets is established within relatively close limits to permit the bolts 70 to be guidably inserted through the tie-in strips, the tubes 68, and the bores 66, and thereafter to be screw threadably installed in the threaded bores 48 of the car body frame 22. Such tightening of the bolts, accomplished without the need for a mechanic to go under the car body frame, assures positively biased interengagement of the upstanding bearing surfaces 40 and 56 during operation of the hydraulic excavator 10.

In this way the weight of the superstructure is normally transmitted through the engaging bearing surfaces 44 and 80 to the undercarriage 26, with a moment arm that forms a normal force couple tending to urge the bearing surfaces 56 of the support brackets tightly against the upstanding bearing surfaces 40 of the frame members 35.

It is to be further appreciated that while lateral loads are easily transmitted by the abutting upstanding bearing surfaces 40 and 56, the aforementioned normal force couple tends to laterally separate the frame members 35 and the support brackets 37 at the lower portions thereof. In accordance with one aspect of the invention, however, the upstanding ledge 76 of the coupling 74 resists such separation forces so that no bolts are required on the bottom of the mounting arrangements.

Since the hydraulic excavator 10 is occasionally subjected to earthmoving operations wherein the rear of the car body frame 22 is elevated, the weight of the rear of the undercarriage 26 and certain other forces would then act in a downward manner on the car body frame. In such an instance the upper ledges 73 of the rear brackets support this weight on the upper edges 42 of the rear frame members and relieve the shear loads on the bolts 70.

DESCRIPTION OF ALTERNATE EMBODIMENT

Referring now to FIG. 5, an alternate embodiment of the present invention is shown which consists of a mounting arrangement 82 including a frame member 84 secured to the car body 22 and a support bracket 86 secured to the undercarriage 26 having a lower coupling 74 and a central projection 58 substantially similar to the preferred embodiment of FIG. 4. Accordingly, similar reference characters have been applied to FIG. 5, where appropriate.

However, it is clearly apparent when making reference to the drawings that the alternate embodiment includes a relatively unique fastening device 88 as shown also in FIG. 6. This device resists lateral separating forces by bearing against a pair of longitudinally extending and vertically oriented bearing surfaces 90 and 92, respectively, formed on a raised ledge 93 of the frame member 84 and on a depending lip 94 formed on an inwardly extending arm 96 of the bracket 86. Lateral compression forces from the undercarriage toward the car body legs 36 are resisted by the abutment of an inwardly facing bearing surface 98 defined on the arm 96 and an outwardly facing bearing surface 100 defined on the frame member. The support bracket arm has an arcuately relieved undersurface 102, and a downwardly facing bearing surface 104 formed in the depending lip 94. In this way each fastening device can transmit loads from the undercarriage arm downwardly therethrough to be supported by an upwardly facing bearing surface 105 defined in the frame member 84 adjacent the raised ledge 93.

More specifically, each fastening device 88 includes a pair of tapered wedges 106 and 108 which are respectively seatably engaged at the intersection of the normally disposed surfaces 92 and 104, and the normally disposed surfaces 90 and 105. Thus, the wedging is achieved through the sliding engagement of a pair of interengaging inclined surfaces 110 and 112 which are respectively formed on the wedges 106 and 108. A longitudinally extending oversize bore 114 is provided in each of the wedges and an elongated threaded bolt 116 extends therethrough and is engaged by a nut 118 at its opposite end. As the nut is screw threadably tightened on the bolt, the wedges are forced into longitudinal alignment whereupon the wedges press against the opposite bearing surfaces to urge them apart.

Thus, the fastening device 88 is adjustable to provide a vertically tight-fitting relationship so that any downward force from the undercarriage 26 may be transmitted through the bearing surfaces 104 of the bracket arm 96, the tapered wedges 106 and 108, and to the upwardly facing bearing surface 105 of the frame member 84 without the need for providing a predetermined vertical clearance between the load bearing surfaces thereof for initial assembly purposes. Similarly, the tightened device provides a laterally tight-fitting relationship between the inwardly facing bearing surface 98 of the arm and the corresponding surface 100 of the frame member.

It is contemplated that the fastening device 88 may desirably include a washer or retaining plate 120 at each end of the wedges 106 and 108 as diagrammatically illustrated in phantom lines in FIGS. 5 and 6. These washers would serve to keep the wedges from working out longitudinally in the event that they should become loose with extended service thereof.

OPERATION OF THE ALTERNATE EMBODIMENT

With the car body frame 22 elevated, the undercarriage 26 is laterally moved horizontally inwardly with the undercarriage hung in a canted counterclockwise position from the position shown in FIG. 5 so that the depending lip 94 of the support bracket 86 is juxtaposed with the top of the raised ledge 93 of the frame member 84. This allows the depending lip to pass laterally inwardly and downwardly into a relatively safe, hooked and entrapped relation within the raised ledge 93 while subsequently also longitudinally aligning them by installation of the projection 58 within the recess 50. Inward and downward movement of the undercarriage and the bracket is continued with the raised ledge 93 effectively traveling upwardly toward the arcuate-relieved surface 102 to permit sufficient vertical clearance to allow the bottom edge 44 of the frame member to be disposed elevationally above ledge 76 of the support bracket. Thereafter the undercarriage is cantibly rocked in a clockwise manner through the weight of the undercarriage and slackened hoist lines to move the upstanding bearing surfaces 40 and 56 into contact, whereupon the undercarriage may be raised to also move the bearing surfaces 44 and 80 into contact. The tapered wedges 106 and 108 are then inserted longitudinally in place intermediate the frame member and the support bracket and the bolt 116 inserted therethrough in order to receive the nut 118 thereon. Subsequent tightening of the nut moves the wedges into longitudinal alignment whereupon the joint is rigidly jammed at the fastening device 88 as previously noted.

In view of the foregoing, it is readily apparent that the mounting arrangement of the present invention provides an improved coupling structure which minimizes the overall width of the vehicle for shipping purposes. For example, the legs 22 of the car body no longer need extend laterally outwardly over the undercarriages, but rather are terminated with upright bearing surfaces 40 which are generally aligned with the laterally inner surfaces of the undercarriages. Furthermore, the mounting arrangement of the present invention allows the undercarriages to be easily coupled to and removed from the car body frame. This is partially due to the relatively low number of fastening bolts which are utilized for positive coupling thereof.

While the invention has been described and shown with particular reference to a preferred and an alternate embodiment, it will be apparent that other variations might be possible that would fall within the scope of the present invention, which is not intended to be limited except as defined in the following claims.

What is claimed is:

1. A mounting arrangement for supporting a vehicle superstructure comprising;
    a pair of laterally opposite track roller frames individually having a longitudinally extending support bracket thereon, each of said support brackets including upright bearing surface means thereon and a lower hook laterally inwardly disposed thereon;
    a pair of laterally opposite frame mounting members on the vehicle superstructure and individually including lower bearing means interlockingly received within said hooks for transferring downward forces thereto and resisting lateral separating forces therebetween, and bearing surface means disposed in facing engagement with said bearing surface means of said support brackets for transferring lateral thrust forces therebetween;

removable fastening means for positively clamping said bearing surface means of said track roller frames and frame mounting members together; and laterally interengaging projection and recess means on said frame mounting members and said support brackets for interlockingly resisting longitudinal shear forces therebetween while permitting free vertical movement therebetween.

2. The mounting arrangement of claim 1 wherein said fastening means includes longitudinally oriented tapered wedge means disposable intermediate said support brackets and said frame mounting members at the upper longitudinal portions thereof for positively locking them together.

3. The mounting arrangement of claim 1 wherein each of said frame mounting members has an upper bearing edge and each of said support brackets includes a laterally inwardly extending upper lip capable of moving inwardly past said upper bearing edge when said lower bearing means is received within said hook for facilitating rocking interengagement of said bearing surface means, and with said lip being capable of absorbing upward forces from said superstructure thereat.

4. A mounting arrangement for supporting a vehicle superstructure comprising;

a vehicle frame having a front mounting member and a rear mounting member on each of the opposite sides thereof, with each of said members including upstanding planar bearing surface means and a depending leg;

an opposite pair of ground-engaging track roller frames having a front support bracket and a rear support bracket thereon, each of said support brackets including upstanding planar bearing surface means for thrust transmitting engagement with said bearing surface means of said member and including a lower coupling disposed in laterally entrapping relation with respect to said depending leg for supporting the weight of the vehicle superstructure and for resisting lateral separating forces thereat; and wherein at least one of said mounting members on each side has a vertically elongated recess therein and wherein at least one of said support brackets has an inwardly extending projection thereon which is received in said recess for resisting longitudinal shear loads therebetween.

5. The mounting arrangement of claim 4 including upper lip means on said support brackets which extend laterally inwardly for entrapping engagement with said frame mounting members.

6. A mounting arrangement for supporting a vehicle superstructure comprising;

a mounting member on said superstructure including upstanding planar bearing surface means, a depending leg, and a recess formed therein;

a ground-engaging frame having a support bracket including upstanding planar bearing surface means for thrust transmitting facing engagement with said bearing surface means of said mounting member, a longitudinally extending lower hook adapted to receive said depending leg for supporting said superstructure and for resisting lateral separating forces thereat, and a laterally inwardly extending projection which is received in said recess for resisting longitudinal shear loads therebetween.

7. The mounting arrangement of claim 6 including a plurality of horizontally inwardly extending fastening devices for positively clamping said bearing surface means facingly together, and with said recess being constructed to freely vertically slidably receive said projection and to longitudinally restrain said projection for resisting longitudinal forces that would otherwise be resisted by said fastening devices.

8. A mounting arrangement for supporting a vehicle superstructure comprising;

a mounting member on said superstructure including upstanding planar bearing surface means, an upper edge, and a lower edge;

a ground-engaging frame having a support bracket thereon including upstanding planar bearing surface means, a laterally inwardly extending upper ledge, and a laterally inwardly extending lower supporting rail;

removable fastening means for positively clamping said planar bearing surface means of said mounting member and said planar bearing surface means of said support bracket facingly together and permitting vertical force transmission cooperatively between said upper edge and said upper ledge, and between said lower edge and said lower supporting rail; and laterally interengaging projection and recess means on said mounting member and on said support bracket for interlockingly resisting longitudinal forces therebetween and thereby relieving said fastening devices from such forces, while permitting free vertical movement therebetween.

9. A mounting arrangement for supporting a vehicle superstructure comprising;

a mounting member on said superstructure including upstanding planar bearing surface means and a lower edge;

a ground-engaging frame having a support bracket thereon including upstanding planar bearing surface means and a laterally inwardly extending lower hook for receiving said lower edge entrappingly therein;

longitudinally oriented tapered wedge means joinably disposed between said mounting member and said support bracket for resisting lateral separating forces therebetween and causing said bearing surface means of said mounting member and said bearing surface means of said bracket to make abutting contact; and laterally interengaging projection and recess means on said mounting member and on said support bracket for interlockingly resisting longitudinal forces therebetween while permitting free vertical movement therebetween.

* * * * *